United States Patent
Kneeland et al.

(10) Patent No.: US 11,895,065 B2
(45) Date of Patent: *Feb. 6, 2024

(54) APPARATUS AND METHOD FOR MATCHING INDIVIDUALS DURING AN EPHEMERAL TIME PERIOD BASED UPON VOTING AND MATCHING CRITERIA

(71) Applicant: AMI Holdings Limited, Hamilton (BM)

(72) Inventors: John Kneeland, London (GB); Benedict Copping, Hamilton (BM)

(73) Assignee: AMI Holdings Limited, Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 17/320,809

(22) Filed: May 14, 2021

(65) Prior Publication Data

US 2022/0014487 A1 Jan. 13, 2022

Related U.S. Application Data

(63) Continuation of application No. 16/175,323, filed on Oct. 30, 2018, now Pat. No. 11,012,387.

(51) Int. Cl.
*H04L 51/046* (2022.01)
*G06F 3/0482* (2013.01)
(Continued)

(52) U.S. Cl.
CPC .......... *H04L 51/046* (2013.01); *G06F 3/0482* (2013.01); *G06F 3/0488* (2013.01); *H04L 51/52* (2022.05); *H04L 67/55* (2022.05)

(58) Field of Classification Search
CPC .... G06F 3/0482; G06F 3/04842; G06F 16/29; G06F 16/955; G06Q 50/01; H04L 51/52
See application file for complete search history.

(56) References Cited

U.S. PATENT DOCUMENTS

| | | | |
|---|---|---|---|
| 7,760,917 B2 | 7/2010 | Vanhoucke | |
| 8,484,186 B1 | 7/2013 | Kapczynski et al. | |

(Continued)

FOREIGN PATENT DOCUMENTS

| | | |
|---|---|---|
| CN | 104854611 | 8/2015 |
| CN | 105474166 | 4/2016 |

(Continued)

OTHER PUBLICATIONS

PCT International Preliminary Report on Patentability in International Appln. No. PCT/IB2019/059318, dated May 14, 2021, 10 pages.

(Continued)

*Primary Examiner* — Mahran Y Abu Roumi
(74) *Attorney, Agent, or Firm* — Fish & Richardson P.C.

(57) ABSTRACT

A computer implemented method includes supplying to a client device prompts for a first individual to provide a vote for a preference of the first individual. The preference relates to an activity during an ephemeral time period. The vote is collected. Matches between the first individual and a pool of individuals are generated based upon common votes and matching criteria. The matches are supplied to the client device. A match acceptance for a second individual is collected from the client device. Network communication is enabled between the first individual and the second individual.

13 Claims, 3 Drawing Sheets

(51) Int. Cl.
   *G06F 3/0488* (2022.01)
   *H04L 51/52* (2022.01)
   *H04L 67/55* (2022.01)

(56) References Cited

U.S. PATENT DOCUMENTS

| | | | |
|---|---|---|---|
| 8,566,327 B2* | 10/2013 | Carrico | G06F 16/3331 |
| | | | 707/748 |
| 8,595,257 B1 | 11/2013 | Ovide | |
| 9,208,177 B2 | 12/2015 | Petrou et al. | |
| D755,814 S | 5/2016 | Rad et al. | |
| 9,342,855 B1 | 5/2016 | Raphael | |
| 9,560,156 B1 | 1/2017 | Rana | |
| D779,540 S | 2/2017 | Rad et al. | |
| D781,311 S | 3/2017 | Rad et al. | |
| D781,334 S | 3/2017 | Rad et al. | |
| D791,809 S | 7/2017 | Rad et al. | |
| 9,715,532 B1 | 7/2017 | Hall et al. | |
| 9,733,811 B2* | 8/2017 | Rad | G06F 3/0482 |
| D798,314 S | 9/2017 | Rad et al. | |
| 9,753,948 B2 | 9/2017 | Farrell | |
| 9,848,082 B1 | 12/2017 | Lillard et al. | |
| 9,959,023 B2 | 5/2018 | Rad et al. | |
| 10,318,109 B2 | 6/2019 | Desjardins | |
| 10,654,942 B2 | 5/2020 | Resnick et al. | |
| 10,810,403 B2 | 10/2020 | Frolovichev | |
| 11,012,387 B2 | 5/2021 | Kneeland et al. | |
| 11,050,688 B2 | 6/2021 | Frolovichev | |
| 2006/0229896 A1 | 10/2006 | Rosen et al. | |
| 2008/0040227 A1 | 2/2008 | Ostermann et al. | |
| 2008/0086431 A1 | 4/2008 | Robinson et al. | |
| 2010/0077032 A1 | 3/2010 | Drennan et al. | |
| 2010/0088111 A1 | 4/2010 | Bailey | |
| 2011/0055334 A1 | 3/2011 | Tivyan | |
| 2011/0191147 A1 | 8/2011 | Cunningham | |
| 2012/0066118 A1 | 3/2012 | Dantas | |
| 2012/0136689 A1* | 5/2012 | Ickman | G06Q 50/01 |
| | | | 705/7.19 |
| 2012/0271380 A1* | 10/2012 | Roberts | H04L 63/068 |
| | | | 607/60 |
| 2012/0290977 A1* | 11/2012 | Devecka | G06Q 30/0273 |
| | | | 715/810 |
| 2012/0296895 A1 | 11/2012 | Robinson et al. | |
| 2013/0102299 A1* | 4/2013 | Liu | H04W 48/18 |
| | | | 455/418 |
| 2013/0165234 A1* | 6/2013 | Hall | A63F 13/30 |
| | | | 463/42 |
| 2013/0179925 A1* | 7/2013 | Woods | H04N 21/4222 |
| | | | 725/51 |
| 2013/0282745 A1* | 10/2013 | Mishra | G06Q 30/00 |
| | | | 707/758 |
| 2013/0282841 A1 | 10/2013 | Bates et al. | |
| 2013/0318162 A1* | 11/2013 | Wright | G06Q 30/08 |
| | | | 709/204 |
| 2013/0346564 A1* | 12/2013 | Warrick | H04L 12/1886 |
| | | | 709/219 |
| 2014/0019173 A1 | 1/2014 | Spindler | |
| 2014/0032434 A1* | 1/2014 | Kumar | G06Q 50/01 |
| | | | 705/319 |
| 2014/0074824 A1 | 3/2014 | Rad et al. | |
| 2014/0115658 A1 | 4/2014 | Ayodele | |
| 2014/0195549 A1* | 7/2014 | Ahn | G06F 16/9535 |
| | | | 707/749 |
| 2014/0258260 A1 | 9/2014 | Rayborn | |
| 2014/0303981 A1 | 10/2014 | Skiba et al. | |
| 2014/0328536 A1 | 11/2014 | Whitehill | |
| 2014/0344031 A1* | 11/2014 | Lineberger | H04L 67/10 |
| | | | 709/204 |
| 2014/0344061 A1 | 11/2014 | Choi et al. | |
| 2014/0357247 A1* | 12/2014 | Assuncao | H04M 1/72454 |
| | | | 455/418 |
| 2015/0046357 A1 | 2/2015 | Danson | |
| 2015/0058059 A1 | 2/2015 | Kahan | |
| 2015/0089660 A1 | 3/2015 | Song et al. | |
| 2015/0161632 A1* | 6/2015 | Humay | G06Q 30/0203 |
| | | | 705/7.32 |
| 2015/0172243 A1 | 6/2015 | Parikh et al. | |
| 2015/0206100 A1 | 7/2015 | Zamel et al. | |
| 2015/0207765 A1 | 7/2015 | Brantingham et al. | |
| 2015/0254618 A1 | 9/2015 | Shivaram | |
| 2015/0310507 A1 | 10/2015 | Woodward | |
| 2016/0021199 A1 | 1/2016 | Krimon et al. | |
| 2016/0105388 A1 | 4/2016 | Bin Mahfooz et al. | |
| 2016/0132608 A1* | 5/2016 | Rathod | H04W 4/21 |
| | | | 707/722 |
| 2016/0140672 A1* | 5/2016 | Shnitzer | G06F 3/0482 |
| | | | 715/753 |
| 2016/0154569 A1* | 6/2016 | Rad | G06F 3/0488 |
| | | | 715/739 |
| 2016/0316503 A1 | 10/2016 | Lo | |
| 2016/0344777 A1* | 11/2016 | Fahlgren | H04L 65/1073 |
| 2016/0381092 A1 | 12/2016 | Dash et al. | |
| 2017/0337521 A1 | 11/2017 | Godbole | |
| 2017/0358033 A1* | 12/2017 | Montoya | H04W 4/21 |
| 2018/0029298 A1 | 2/2018 | Takaya et al. | |
| 2018/0150205 A1 | 5/2018 | Rad et al. | |
| 2018/0189072 A1 | 7/2018 | Mobeen | |
| 2018/0285986 A1* | 10/2018 | Perry | H04L 51/52 |
| 2018/0292981 A1* | 10/2018 | Rad | G06F 3/04842 |
| 2019/0050929 A1 | 2/2019 | Kumar | |
| 2019/0080012 A1 | 3/2019 | Huang | |
| 2019/0158305 A1* | 5/2019 | Cui | F24F 11/58 |
| 2019/0164108 A1* | 5/2019 | Chimka | G06Q 50/01 |
| 2020/0125700 A1 | 4/2020 | Chang et al. | |
| 2020/0134288 A1 | 4/2020 | Frolovichev | |
| 2020/0134739 A1 | 4/2020 | Frolovichev | |
| 2020/0137003 A1 | 4/2020 | Frolovichev | |
| 2020/0137007 A1 | 4/2020 | Kneeland et al. | |
| 2021/0103715 A1 | 4/2021 | Frolovichev | |
| 2021/0249912 A1 | 8/2021 | Glover | |
| 2021/0400001 A1 | 12/2021 | Frolovichev | |

FOREIGN PATENT DOCUMENTS

| | | |
|---|---|---|
| CN | 103092899 | 12/2016 |
| CN | 104170316 | 1/2018 |
| CN | 107526610 | 7/2021 |
| RU | 124504 | 1/2013 |
| RU | 130434 | 7/2013 |
| WO | WO 2016/076976 | 5/2016 |
| WO | WO 2017/054081 | 4/2017 |

OTHER PUBLICATIONS

PCT International Search Report and Written Opinion in International Appln. No. PCT/IB2019/059318, dated Feb. 4, 2020, 13 pages.

PCT Invitation to Pay Additional Fees in International Appln. No. PCT/IB2019/059318, dated Dec. 11, 2019, 14 pages.

* cited by examiner

APPARATUS AND METHOD FOR MATCHING INDIVIDUALS DURING AN EPHEMERAL TIME PERIOD BASED UPON VOTING AND MATCHING CRITERIA

CROSS-REFERENCE TO RELATED APPLICATIONS

This application is a continuation application of and claims priority to U.S. application Ser. No. 16/175,323, filed on Oct. 30, 2018.

FIELD OF THE INVENTION

This invention relates generally to social media dating applications deployed in computer networks. More particularly, this invention is directed toward techniques for matching individuals during an ephemeral time period based upon voting and matching criteria.

BACKGROUND OF THE INVENTION

Many individuals avoid social media dating applications that require a user to input extensive information about himself or herself Therefore, several popular social media dating applications require only basic information, such as age preference, location range and a photo. While such minimalistic approaches have appeal, they may lead to inappropriate matches. Therefore, there is a need to maintain a simple social media dating application entry process that collects sufficient information to establish improved matches.

SUMMARY OF THE INVENTION

A computer implemented method includes supplying to a client device prompts for a first individual to provide a vote for a preference that relates to an activity during an ephemeral time period. The vote is collected. Matches between the first individual and a pool of individuals are generated based upon common votes and matching criteria. The matches are supplied to the client device. A match acceptance is collected from the client device for a second individual. Network communication is enabled between the first individual and the second individual.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
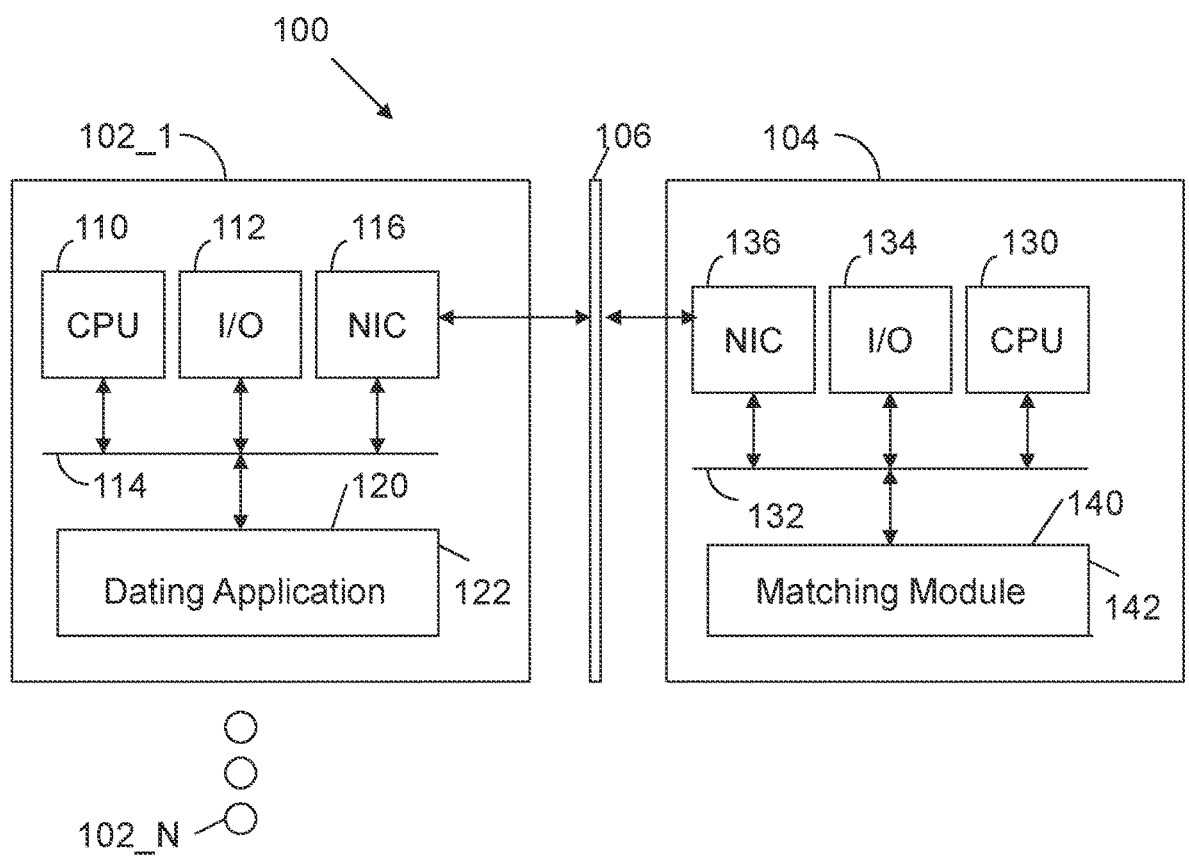
FIG. 1 illustrates a system configured in accordance with an embodiment of the invention.

FIG. 1 illustrates a system 100 configured in accordance with an embodiment of the invention. The system 100 includes a set of client devices 102_1 through 102_N in communication with a server 104 via a network 106, which may be any combination of wired and wireless networks. Each client device 102 includes a processor (e.g., central processing unit) 110 in communication with input/output devices 112 via a bus 114. The input/output devices 112 may include a keyboard, mouse, touch display and the like. A network interface circuit 116 is also connected to the bus 114 to provide connectivity to network 106. A memory 120 is also connected to the bus 114. The memory 120 stores instructions executed by the processor 110. In particular, the memory 120 stores a dating application 122, which communicates with server 104 to coordinate introductions between individuals that have been identified as potential matches, and where at least one individual has accepted the potential match. Typically, each client device 102_1 through 102_N is a mobile device executing the dating application 122. Different client devices 102_1 through 102_N are operated by different individuals that subscribe to the same dating application 122.

Server 104 includes standard components, such as a processor 130, bus 132, input/output devices 134 and a network interface circuit 136 to provide connectivity to network 106. A memory 140 is connected to the bus 132. The memory 140 stores a matching module 142 with instructions executed by the processor 130 to implement operations disclosed in connection with FIG. 2.

Figure 2:
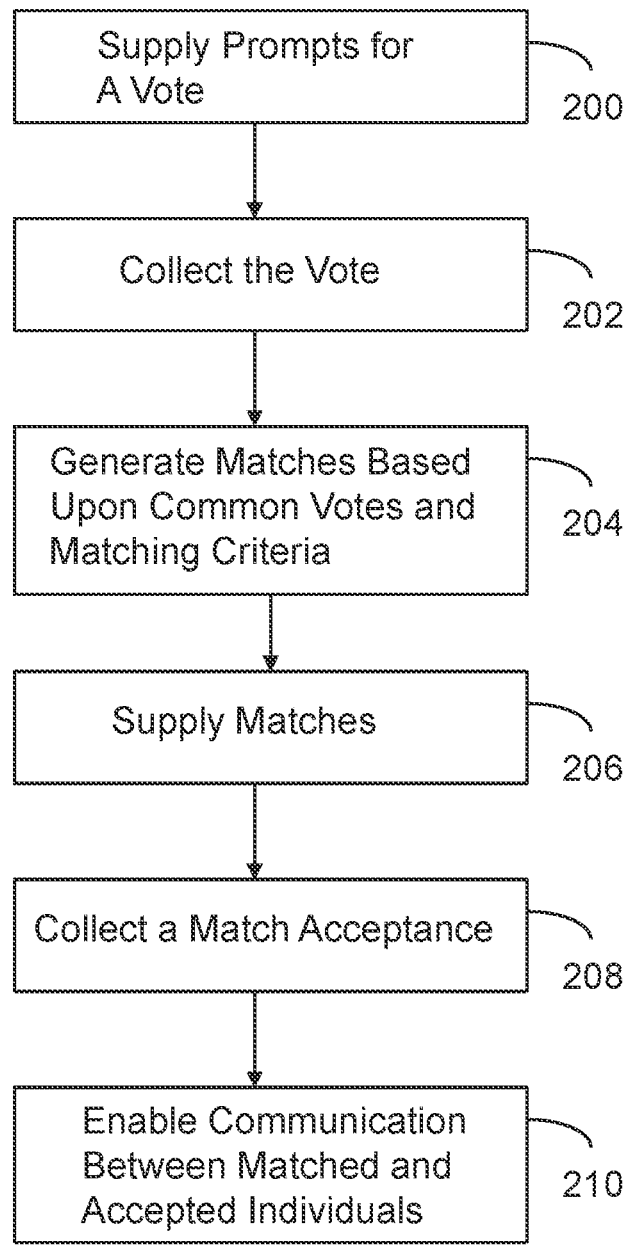
FIG. 2 illustrates processing operations performed in accordance with an embodiment of the invention.

Turning to FIG. 2, the matching module 142 initially supplies prompts for a vote 200. That is, the matching module 142 supplies to a client device operated by a first individual a user interface with prompts that are used to collect a vote for a preference of the first individual. The preference relates to an activity during an ephemeral time period. For example, the first individual may be asked to vote on the following: "Today, during 5-7 pm 'Happy Hour', would you prefer (1) Pizza, (2) Tacos, (3) Martinis, or (4) None of These."

Figure 3:
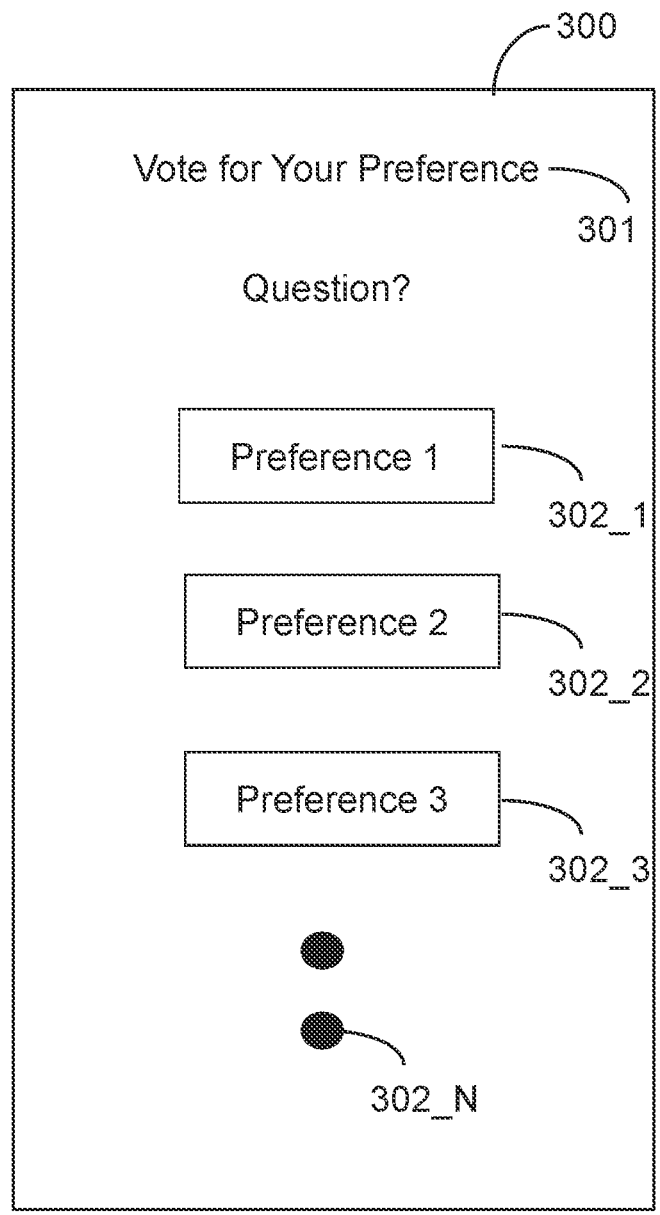
FIG. 3 illustrates a user interface configured in accordance with an embodiment of the invention.

FIG. 3 illustrates a user interface 300 that may be supplied from the matching module 142 to a client device 102 in accordance with an embodiment of the invention. The user interface 300 includes a prompt 301 for a first individual to provide a vote on a question of an activity during an ephemeral time period. The prompt 301 includes multiple choices or preferences 302_1 through 302_N from which the first individual can choose. The preferences may be the "Happy Hour" preferences listed in the prior paragraph. The first individual may provide an input (e.g., a tap on the screen of the client divide) to the user interface 300 to vote for the preference on the question. Thus, the interface 300 provides a simple social media dating application entry process that collects personal preferences to establish compatible, accelerated and improved matches.

Returning to FIG. 2, vote is collected 202 from client devices 102_1 through 102_N at the server 104. The matching module 142 then generates matches 204 based upon common votes and matching criteria. The common votes represent the same preferences voted by different individuals. The matching criteria may be based upon any number of factors (e.g., age, gender, geographical area, height, weight, appearance, and/or the like). The matching module 142 may use any number of techniques including applied rules, collaborative filtering and/or machine learning to generate matches. In some embodiments, when generating the matches, the common votes have a weight greater than a weight of the matching criteria during an ephemeral time period. This mechanism enables the matches to be compatible and accelerated. In one embodiment, once the ephemeral time period passes, matches are generated based solely on the matching criteria. In another embodiment, once the ephemeral time period passes, matches are generated based on the matching criteria with a greater weight and the common votes with a less weight.

The matches are then supplied 206 from the matching module 142 at the server 104 to one or more client devices 102. A match acceptance for a second individual is then collected 208 from client devices 102. For example, a photograph of an individual may be presented and a first gesture (e.g., a swipe down on the screen or a swipe to the left on the screen) may indicate no interest, while a second gesture (e.g., a swipe up on the screen or a swipe to the right on the screen) may indicate interest.

Network communication is then enabled between matched and accepted individuals 210. For example, network communication in the form of a text message may be enabled between a first individual and a second individual in response to a match between the first individual and the second individual and a match acceptance by at least one of the first individual and the second individual. The criteria to enable communication may be configured in a variety of manners. For example, it may be specified that only one gender may initiate communication. Enabling communication may be predicated upon a single individual accepting a match. Alternately, enabling communication may be predicated upon a requirement that both a first individual and a second individual accept a match. Communication may be enabled for an ephemeral time period (e.g., an hour). During the ephemeral time period, the first individual or the second individual may communicate with each other via the network. Once the ephemeral time period passes, the matching module 142 may generate matches based upon the matching criteria only, and not based upon the vote.

Thus, the matching module 142 facilitates a digital service that can connect individual users through mutual agreement (matching) for purposes including, but not exclusively, socialising, networking, and dating. The dating application 122 enables communication for an ephemeral time period between users who share a common interest (i.e., a common vote). Such matching mechanisms may facilitate the subsequent communication and accelerate the connecting between the users. The dating application 122 may be implemented as an application for a mobile device, a website or a standalone computer application.

In some embodiments, the server 104 sends a push notification message to the client device 102 to invite the users to vote on a preference for an activity during a specified time period. Users have an option to join or not join. The ephemeral time period may be a pre-determined time of a day (e.g., "Happy Hour between 5 and 7 pm").

A user's personal profile can include name, age, city, photographs, biographical text, links to social media profiles on other networks, and a range of other fields that allow users to characterize themselves. Once a profile is complete, a user can begin to view the profiles of other users, while the new profile is circulated among the user base.

In one embodiment, a user is able to filter the profiles of other users that are served to them for viewing through setting restrictions upon the age, location, or potentially any other personal attribute.

A user receives profiles of other users who have met the filtering criteria; the user is able to explore the personal information that has been added to a profile. Profiles are served to the user one-by-one, with the option to look through multiple pictures per profile, expand text, and click through to external information and profiles on other social networks. To ascertain the mutual agreement to connect two users together, every profile viewed must be 'selected' on.

Having viewed the personal profile of another user, the viewing user swipes (click and drag the profile using their finger) the served profile off the screen in a certain direction (e.g., right or up) if they would like to connect with that specific user or (e.g., left or down) if they do not.

In one embodiment, once a user has selected yes upon the profile of another user, the matching module 142 places the profile of the first user into the queue of profiles to be viewed by the second user. Through this mechanism the matching module 142 is able to accelerate the pace with which two users may view each-other's profiles than would happen in a purely organic system of profile selection.

In one embodiment, the system does not require that both users be online at the same time for a match to be suggested. In one embodiment, when one user selects yes and the other user selects no, no further connection is established between the two users, and their profiles may not be shown to each-other again (or they may be shown again depending on changes within their profile, location, search parameters, or because of time elapsed). When two users both mutually select 'yes' upon the other user's profile, a connection is established between the two accounts which allows for direct communication. In one embodiment, matched users are directed to a direct messaging system supported by server 104. This system can display elements of a user's profile in order to increase recognition of the other user (e.g., name, age, photograph).

Through this the system creates a unique mechanism through which the intention of each user is communicated to other users within the social network. Once users are within the chat function, they can then send direct messages back and forth to one-another. Within the chat function, users are also able to modify the status of the connection by 'unmatching', which is to revoke their side of the mutual agreement to be connected. Users can also 'block' the other user, which serves the same purpose as 'unmatching', but ensures their profile will not be served to the 'blocking' user again.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method, comprising:
    sending a push notification to a client device with a prompt for a first individual to provide a vote for a preference that relates to an activity during an ephemeral time period;
    receiving, from the client device, the vote for the preference by the first individual that relates to the activity during the ephemeral time period;
    accessing matching criteria associated with the first individual, the matching criteria specifying one or more characteristics of one or more individuals from a pool of individuals;
    generating matches between the first individual and one or more individuals from the pool of individuals based upon common votes and the matching criteria, the common votes representing a corresponding preference indicated by the vote from the first individual and votes of the one or more individuals from the pool of individuals, wherein generating the matches includes applying respective weights to the common votes and the matching criteria, wherein the common votes have a greater weight than a weight of the matching criteria during the ephemeral time period, and wherein generating the matches further includes:
        during the ephemeral time period, applying a first weight to the common votes; and
        after the ephemeral time period, applying a second weight to the common votes that is greater than the first weight applied to the common votes;
    supplying to the client device data for display on a graphical user interface, the data including the matches and prompts for the first individual to accept or decline the matches;
    receiving a match acceptance from the client device for a second individual;
    in response to receiving the match acceptance, enabling network communication by a messaging system between the first individual and the second individual for the ephemeral time period; and
    automatically disabling the network communication by the messaging system after the ephemeral time period expires.

2. The method of claim 1, wherein the messaging system is configured to display an image associated with the first individual or the second individual.

3. The method of claim 1, wherein the vote is received in response to an input to a graphical user interface of the client device.

4. The method of claim 1, wherein the client device comprises a mobile device.

5. The method of claim 1, wherein the common votes have a greater weight than a weight of the matching criteria during the ephemeral time period to improve the compatibility of matches.

6. The method of claim 1, wherein the network communication by the messaging system between the first individual and the second individual for the ephemeral time period is enabled in response to receiving the match acceptance to accelerate a connection between the first individual and the second individual.

7. A system, comprising:
    at least one processor; and
    at least one computer-readable storage medium storing instructions executable by the at least one processor to perform operations comprising:
        sending a push notification to a client device with a prompt for a first individual to provide a vote for a preference that relates to an activity during an ephemeral time period;
        receiving, from the client device, the vote for the preference by the first individual that relates to the activity during the ephemeral time period;
        accessing matching criteria associated with the first individual, the matching criteria specifying one or more characteristics of one or more individuals from a pool of individuals;
        generating matches between the first individual and one or more individuals from the pool of individuals based upon common votes and the matching criteria, the common votes representing a corresponding preference indicated by the vote from the first individual and votes of the one or more individuals from the pool of individuals, wherein generating the matches includes applying respective weights to the common votes and the matching criteria, wherein the common votes have a greater weight than a weight of the matching criteria during the ephemeral time period, and wherein generating the matches further includes:
            during the ephemeral time period, applying a first weight to the common votes; and
            after the ephemeral time period, applying a second weight to the common votes that is greater than the first weight applied to the common votes;
        supplying to the client device data for display on a graphical user interface, the data including the matches and prompts for the first individual to accept or decline the matches;
        receiving a match acceptance from the client device for a second individual;
        in response to receiving the match acceptance, enabling network communication by a messaging system between the first individual and the second individual for the ephemeral time period; and
        automatically disabling the network communication by the messaging system after the ephemeral time period expires.

8. The system of claim 7, wherein the messaging system is configured to display an image associated with the first individual or the second individual.

9. The system of claim 7, wherein the vote is received in response to an input to a graphical user interface of the client device.

10. The system of claim 7, wherein the client device comprises a mobile device.

11. At least one non-transitory computer-readable storage medium storing instructions executable by at least one processor to perform operations comprising:
    sending a push notification to a client device with a prompt for a first individual to provide a vote for a preference that relates to an activity during an ephemeral time period;

receiving, from the client device, the vote for the preference by the first individual that relates to the activity during the ephemeral time period;

accessing matching criteria associated with the first individual, the matching criteria specifying one or more characteristics of one or more individuals from a pool of individuals;

generating matches between the first individual and one or more individuals from the pool of individuals based upon common votes and the matching criteria, the common votes representing a corresponding preference indicated by the vote from the first individual and votes of the one or more individuals from the pool of individuals, wherein generating the matches includes applying respective weights to the common votes and the matching criteria, wherein the common votes have a greater weight than a weight of the matching criteria during the ephemeral time period, and wherein generating the matches further includes:

during the ephemeral time period, applying a first weight to the common votes; and after the ephemeral time period, applying a second weight to the common votes that is greater than the first weight applied to the common votes;

supplying to the client device data for display on a graphical user interface, the data including the matches and prompts for the first individual to accept or decline the matches;

receiving a match acceptance from the client device for a second individual;

in response to receiving the match acceptance, enabling network communication by a messaging system between the first individual and the second individual for the ephemeral time period; and automatically disabling the network communication by the messaging system after the ephemeral time period expires.

12. The at least one non-transitory computer-readable medium of claim 11, wherein the messaging system is configured to display an image associated with the first individual or the second individual.

13. The at least one non-transitory computer-readable medium of claim 11, wherein the vote is received in response to an input to a graphical user interface of the client device.

\* \* \* \* \*